Oct. 27, 1970      C. B. WOOFTER      3,535,925
RAIN GAUGE
Filed Nov. 18, 1968
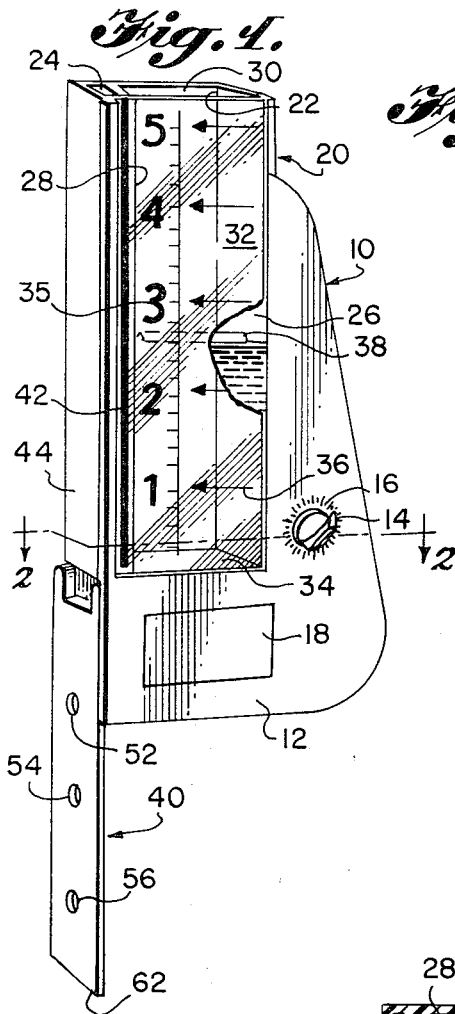
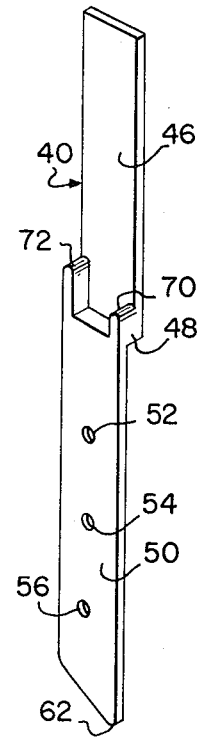
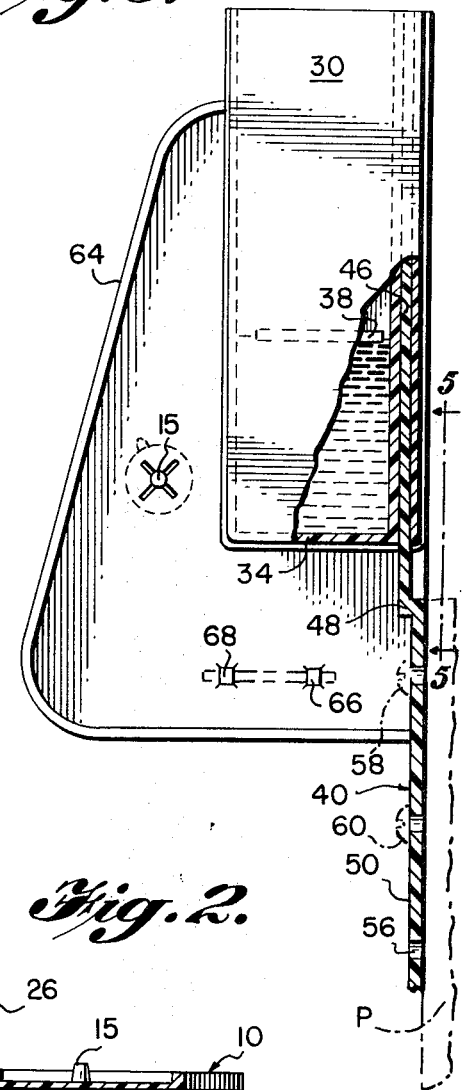
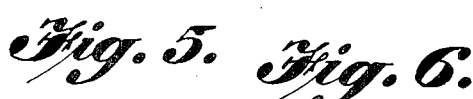
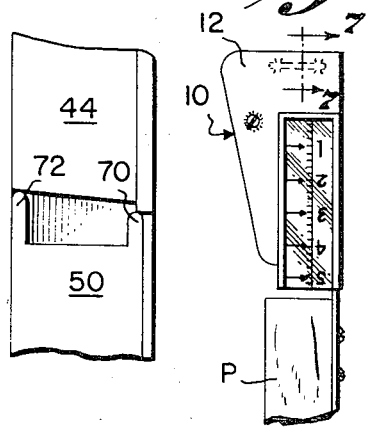
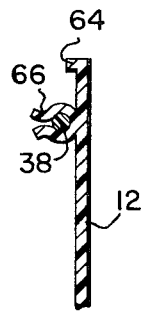
INVENTOR
CECIL B. WOOFTER
BY *Schellin & Hoffman*
ATTORNEYS United States Patent Office 3,535,925
Patented Oct. 27, 1970

3,535,925
RAIN GAUGE
Cecil B. Woofter, Newton, Iowa, assignor to
The Vernon Company
Filed Nov. 18, 1968, Ser. No. 776,426
Int. Cl. G01n 1/14
U.S. Cl. 73—171       8 Claims

ABSTRACT OF THE DISCLOSURE

A plastic rain gauge comprising a gauge body including a receptacle with an open upper end for receiving liquid therein, a base plate for supporting the receptacle, a channel defined in said gauge body in proximity to said receptacle, and a stake insertable into said channel for mounting the receptacle in operative position. The receptacle has graduated markings on its face and a light-weight marker disposed within the receptacle to float atop the liquid so that the gauge can be read at a distance. The base plate has an accumulative meter that is manually adjusted to represent on an arcuate scale the total amount of liquid collected within a period of time, as well as an integrally formed clip that retains the marker on the plate when the gauge is inverted for winter storage.

BACKGROUND OF THE INVENTION

Field of the invention

The instant invention relates generally to rain gauges of the variety utilized by homeowners for lawn care and by farmers for crop cultivation, and more particularly to improvements in the structural configuration and operational characteristics of the mounting means, indicating means and accumulative meter means employed by such rain gauge.

Description of the prior art

Although rain gauges of various designs have gained widespread acceptance, all commercially available gauges suffer from one or more of the following enumerated interrelated deficiencies which severely limit their versatility.

Initially, the bulk of known gauges employ mounting members constructed so as to be suitable for securement exclusively to a fence post or within the ground. Additionally, these known mounting members can be oriented in only one plane, and the rain gauge must be disassembled for winter storage, lest ice form within the gauge and cause same to fracture.

Secondly, the bulk of known gauges are difficult to read accurately at a distance, thus forcing the user to walk up to the gauge to determine the amount of liquid collected within the gauge. Whereas this procedure may constitute a minor inconvenience for the homeowner, it may well be a serious drawback for the farmer who has set out a multitude of gauges at various points within his fields.

Thirdly, the bulk of known gauges have limited capacities and make no provision for recording and/or indicating the total rainfall accumulated over a particular period of time. Thus, after the gauge has reached its capacity and has been emptied, the user must either record such fact in a separate ledger at a later time or must remember such total. In either event, the lack of an on the spot recorder and/or accumulative indicator limits the usefulness and accuracy of the rain gauge.

Numerous rain gauge configurations have been evolved in an effort to negate one or more of the three major shortcomings noted above. All of these gauges have met with but limited success, however.

For example, the rain gauge disclosed by Pat. 1,153,355 granted to W. E. Tredway, proposes a rain gauge with a removable overflow vessel disposed within the gauge housing for accommodating rainfall in excess of the capacity of the collecting receptacle. Tredway further proposes a pair of standards with bi-colored ribbons at opposite sides of the collecting receptacle and a chart at the bottom of the gauge housing for recording and/or indicating the total rainfall for a certain period of time. Additional, Tredway suggests positioning the glass tube which receives the liquid within an outer collection vessel of relatively larger diameter so that the graduations upon the inner tube will be magnified.

However, despite the numerous innovations of the Tredway rain gauge, there is no suggestion whatsoever in such patent of versatile mounting means for positioning the gauge, with equal facility, upon a fence post or within the ground. Additionally, although the arrangement of a first glass tube within a second collection vessel will magnify the graduations, such magnification will occur only with considerable distortion, and thus the Tredway gauge fails to completely solve the problem of accurately reading the gauge at a distance. Lastly, in order to record the rainfall on the chart associated with the Tredway gauge, the user must carry a writing implement with him or secure same to the chart in some fashion; also, the chart is exposed to climatic conditions and the writing may soon become illegible. Obviously, if the user were to forget his writing implement, the accuracy of the chart would be lost; Similarly, if the chart becomes illegible, its value as a recording and/or indicating aid is negated.

Patent 2,513,605, granted to F. L. Vernon, discloses a rain gauge with a bracket that receives and supports therein a rain-receiving cylindrical tube. Such bracket, however, has a rearwardly extending base that can only be secured by screws to a planar surface, such as a fence post or tree stump. Additionally, the rain gauge disclosed by the Vernon patent can not be read at a distance and no provision is made for recording and/or indicating the total rainfall for a particular period of time.

Another proposed solution to these problems is disclosed by Pat. 2,907,206, granted to J. W. O'Neil. The rain gauge of this patent includes a tubular receptacle with graduated markings extending along one face and an elongated rod with vertically spaced clips thereon for retaining the receptacle in operative position. The rod is pointed at its lower end so that it can be driven easily into the ground. Although such gauge is admittedly simple and inexpensive to manufacture and install, it manifestly lacks the desired versatility necessary to solve the above discussed problems with regard to the mounting means, the indicating means and the accumulative meter and/or indicator means.

Still another solution to these shortcomings is proposed by Pat. 3,039,304, granted to C. E. Meyers. The rain guage depicted by such patent includes, inter alia, an elongate upright receptacle that is pivotally secured to an inverted U shaped pair of legs which are inserted into the ground in order to support the receptacle in operative position. When the guage is full the receptacle is emptied by tilting same about the horizontal bight portion of the legs so that the accumulated liquid is poured out. Once again, it is readily apparent that the configuration of the legs of the Meyers' rain gauge precludes mounting same upon a fence post; furthermore, no provision is made for reading such gauge at a distance or for recording and/or indicating in the field the liquid collected within a particular period of time.

SUMMARY

Thus, with the deficiencies of the known rain gauges enumerated above in mind, the instant invention contemplates an accurate, compact and watertight rain gauge with (1) improved mounting means adapted to retain a receptacle in operative position upon the ground or secured to a fence post and further adapted to store the gauge in inverted condition, (2) indicating means readily readable with clarity at a considerable distance, and (3) an accumulative gauge for representing the total amount of liquid gathered during a certain time period. The first objective is realized by the provision of a channel extending along the length of the receptacle and sharing a common wall therebetween. The channel accommodates the upper end of the mounting stake; such stake tapers to a point at its lower extremity and has a series of screw holes spaced along its bottom portion. The second objective is realized by the provision of a brightly-colored marker that floats atop the liquid collected within the receptacle and coacts with the graduations on the face of the receptacle. The third objective is realized by the provision of a manually adjustable knob and graduated scale located on the base plate in proximity to the receptacle, so that the knob can be advanced to a new reading each time the receptacle is removed from the mounting stake and emptied.

Other objects and advantages of the instant invention will become apparent in light of the following description of the invention when construed in connection with the accompanying sheet of drawings.

DESCRIPTION OF THE DRAWINGS

FIG. 1 is a perspective view of a rain gauge constructed in accordance with the principles of the instant invention, such gauge having a portion of its front face broken away to reveal a marker floating atop the water in the receptacle;

FIG. 2 is a horizontal cross-sectional view of gauge body showing both the receptacle and the channel, such view being taken along line 2—2 of FIG. 1 and in the direction indicated;

FIG. 3 is a rear elevational view of the gauge body secured to a portion of a fence post, such view having a corner of both the receptacle and the channel broken away to show the accumulated liquid as well as the cooperation between the channel and the mounting stake;

FIG. 4 is a perspective view of the mounting stake;

FIG. 5 is side elevational view taken along line 5—5 of FIG. 3 and in the direction indicated, such view showing a junction between the mounting stake and the exterior side wall of the channel;

FIG. 6 is a front elevational view, on a reduced scale, showing the gauge in inverted position upon the mounting stake;

FIG. 7 is a vertical cross-sectional view of the retaining clip for the marker, such view being taken along line 7—7 of FIG. 6 and in the direction indicated.

DESCRIPTION OF THE PREFERRED EMBODIMENT

Referring now in greater detail to the drawings in which similar reference numerals refer to similar parts, FIG. 1 depicts a rain gauge executed in rustproof styrene plastic in accordance with the instant invention, such gauge being indicated generally by reference numeral 10. Gauge 10 comprises a base plate 12 that curves downwardly at its right side and has a right-angled cutout at its left side. On the front face of the base plate 12 is a rotatable knob 14 and an arcuate graduated scale 16, the leading edge of the knob cooperating with the scale to represent accumulated rainfall over a period of time. The knob is retained in place by pressing stub shaft 15 through slots in the plate 12, as seen in FIGS. 2 and 3. A written legend containing advertising material is identified by reference numeral 18.

The body of the gauge, indicated generally by reference numeral 20, is either integrally formed within the cutout portion of base plate 12 or is permanently secured thereto. Body 20 comprises two major components, receptacle 22 and channel 14.

Receptacle 22, which opens upwardly to receive liquid such as rainfall or sprinkled water, is defined by a right side wall 26 and a left side wall 28, and a rear wall 30 and a front face 32. A bottom wall 34 of rectangular configuration joins the other walls together in watertight fashion. All of these walls are opaque except for front face 32 which is transparent. Graduated markings 35, such as inches and ractions of inches, are designated on the front face 32 of the receptacle and are distinctly contrasted with the color selected for the other visible surfaces. If desired, the indicating arrows 36 that point out the successive inch levels, can also be painted a contrasting color.

As depicted by the broken away portion of the front face 32 or receptacle 22, the water level rests at two and a half inches. Floating atop the water within the receptacle is brightly colored marker 38, which is made from plastic or balsa wood. Marker 38 cooperates with markings 35 and arrows 36 to indicate the amount of liquid collected by receptacle 22.

A mounting stake, indicated generally by reference numeral 40, is employed to secure the body of the gauge in operative position with receptacle 22 oriented in a vertical plane. Stake 40, the upper end of which is hidden from sight in FIG. 1 by a vertical line 42 on the face of the channel 24, is described in detail with reference to FIGS. 3–5. A post to which the gauge might be attached is represented by a phantom outline.

Turning now to FIG. 2, it will be seen that a channel 24 with a tapered side wall 28 is formed at the left side of gauge body 20 adjacent to receptacle 22 and sharing the above mentioned common side wall 28. The depth of channel 24 is defined by side wall 28 and exterior side wall 44, whereas the length of the channel is defined by a minor extension of rear wall 30 and front face 32. Channel 24 is open at both ends and is equal in height to receptacle 22. The taper of side wall 28 enables the mounting stake 40 to be readily inserted into, and removed from channel 24.

FIG. 3 illustrates the rear face of the rain gauge, and more fully reveals the shape of base plate 12 and the outline of mounting stake 40. The stake, as seen partially in the broken away portion of the rear wall of receptacle 22 and in the dotted lines extending upwardly therefrom, comprises an upper vertical portion 46, a short horizontal offset 48, and a lower vertical portion 50. Lower portion 50 has three holes 52, 54, and 56 therein for enabling screws 58 and 60 to be passed therethrough for securement to a fence post P or building. Portion 50 slopes downwardly into a sharp point 62 which enables the mounting stake to be inserted into the ground for securement purposes, if so desired.

The rear face of base plate 12 also includes a peripheral reinforcing flange 64 and a pair of integrally formed clips 66 and 68. The clips open rearwardly and are spaced to accommodate marker 38 therein when gauge is inverted and stored for the winter. The end of shaft 15 that supports rotatable knob 14 (see in dotted outline) is also visible in this view.

Additional structural details of mounting stake 40 are shown in FIGS. 4 and 5. Horizontal offset 48 is bounded at one end by a first post 70 and at the opposite end by a second, slightly larger post 72.

A line drawn between the tops of the posts will slope slightly downwardly to the right. The lower boundary of exterior side wall 44 also slopes gradually downwardly to the right so that when the gauge body 20 is seated upon the mounting stake, the open upper end of receptacle 22 is parallel to offset 48.

FIG. 6 shows the gauge 10 retained in inverted position upon mounting stake 40 for storage purposes. Obviously, any water collected within receptacle 22 will freeze and thus expand and damage the receptacle when exposed to temperatures of 32° F. or below. In order to obviate this potential problem, gauge body 20 is removed from upper section 46 of mounting stake 40 by sliding plate 12 upwardly. Receptacle 22 is then inverted, and the mounting stake is re-inserted into the opposite or upper end of channel 24. Marker 38, as seen in FIGS. 6 and 7, is snapped into clips 66 and 68 so that it will not be lost during storage.

Although the expeditious manner in which the gauge is used is largely self-evident, a brief summary of the manner of using the instant gauge is thought to be helpful in more fully appreciating the unique structural relationships disclosed above.

The first step is to select a suitable place such as a fence post, building or lawn, to position the gauge. Next mounting stake 40 is either inserted into the lawn with edge 62 or secured to the post by screws 58 and 60. Upper portion 46 of the mounting stake is then inserted into channel 24, and the gauge body is slid downwardly until the tapered lower edge of exterior side wall 44 abuts against posts 70 and 72. Marker 38 is then removed from clips 66 and 68 and is dropped into receptacle 22 where it will float atop the liquid accumulated therein.

Whenever it is necessary to empty the gauge, e.g. at the expiration of a week or when marker 38 approaches the capacity of the receptacle, then the user records such total on the manually adjustable accumulative knob 14 with its cooperating arcuate dial 16. Next, the user grasps base plate 12 and slides same upwardly until upper portion 46 of mounting stake 30 is freed from channel 24; lastly, the gauge is inverted and emptied and the procedure is repeated again.

Since numerous additional modifications of the invention may be made without departing from the scope thereof, it is to be understood that all matter herein set forth or shown in the accompanying drawings is to be interpreted as illustrative in nature and not in a limiting sense.

I claim:
1. A rain gauge comprising:
 (a) a base plate having a cut-out section,
 (b) a gauge body positioned within said cut-out section and permanently secured to said base plate,
 (c) said gauge body comprising a receptacle and a channel,
  (1) said receptacle being open at its upper end and closed at its lower end, said receptacle being defined by a pair of spaced side walls, a spaced front and back wall, and a bottom wall that extends between said side walls and said front and back walls and joins same together,
  (2) said front wall being transparent and having graduated markings thereon that correspond to the amount of liquid contained within the receptacle,
  (3) said channel being defined by a pair of spaced side walls and a spaced front and back walls,
 (d) mounting means insertable into said channel to retain said receptacle in operative position, and
 (e) marker means that float atop the liquid contained within the receptacle and cooperate with the graduated markings thereon so that said gauge can be read at a distance.

2. The rain gauge as defined in claim 1 wherein said base plate has resilient fingers formed on one face thereof, such fingers retaining said marker means secured upon said base plate for storage purposes.

3. The rain gauge as defined in claim 1 wherein said base plate has a rotatable knob secured thereto and a graduated scale spaced in an arcuate path in proximity to said knob for cooperation therewith, said knob being manually advanced along said scale to represent the total amount of liquid collected within the receptacle in a particular period of time.

4. The rain gauge as defined in claim 1 wherein said receptacle and said channel share a common side wall.

5. The rain gauge as defined in claim 4 wherein said common side wall is slightly tapered in horizontal cross-section.

6. The rain gauge as defined in claim 1 wherein said mounting means comprises a stake, said stake including an upper vertical portion, a short horizontal offset, and a lower vertical portion.

7. The rain gauge as defined in claim 6 wherein said horizontal offset of said stake has a pair of posts at opposite ends thereof, said posts being unequal in height so as to present a slanted surface, the lower edge of one of said side walls that define said channel having a similar slanted surface whereby said gauge body is properly seated when said two slanted surfaces abut against each other.

8. The rain gauge as defined in claim 6 wherein said lower vertical section of said stake has a bottom edge that tapers downwardly into a sharp point, and said lower vertical section further includes a series of holes passing therethrough for securement purposes.

References Cited

UNITED STATES PATENTS

| | | | |
|---|---|---|---|
| 1,407,068 | 2/1922 | Johnson | 73—171 |
| 2,513,605 | 7/1950 | Vernon | 73—171 X |

JERRY W. MYRACLE, Primary Examiner